United States Patent [19]

Erath

[11] Patent Number: 5,663,931
[45] Date of Patent: Sep. 2, 1997

[54] SEGMENTATION AND POLARIZATION IN A HYDROPHONE CRYSTAL

[75] Inventor: Louis W. Erath, Abbeville, La.

[73] Assignee: Syntron, Inc., Houston, Tex.

[21] Appl. No.: 545,342

[22] Filed: Oct. 19, 1995

[51] Int. Cl.⁶ .................................. H04R 17/00
[52] U.S. Cl. .................................... 367/165
[58] Field of Search ........................ 367/140, 157, 367/180, 153, 173, 165; 310/322, 325, 337, 334

[56] References Cited

U.S. PATENT DOCUMENTS

| | | | |
|---|---|---|---|
| 3,187,300 | 6/1965 | Brate | 310/337 |
| 3,988,620 | 10/1976 | McDavid | 367/155 |
| 4,017,824 | 4/1977 | Fife et al. | 367/155 |
| 4,174,503 | 11/1979 | Merklinger et al. | 330/300 |
| 4,464,739 | 8/1984 | Moorcroft | 367/130 |
| 4,509,037 | 4/1985 | Harris | 340/347 |
| 4,799,201 | 1/1989 | Nelson | 367/41 |
| 4,833,659 | 5/1989 | Geil et al. | 367/155 |
| 4,841,494 | 6/1989 | Banno | 367/157 |
| 4,876,675 | 10/1989 | Ogura et al. | 367/155 |
| 4,977,546 | 12/1990 | Flatley et al. | 367/140 |
| 5,029,147 | 7/1991 | Andrews et al. | 367/134 |
| 5,051,799 | 9/1991 | Paul et al. | 375/25 |
| 5,193,077 | 3/1993 | Weiglein et al. | 367/23 |
| 5,335,548 | 8/1994 | Kalibjian | 73/655 |
| 5,363,344 | 11/1994 | Sofen | 367/157 |

OTHER PUBLICATIONS

Piezotronic Technical Data, Brush Electronics Company, 1952, pp. 1–27.
Material Descriptions and Typical Applications, pp. 12–13.
IEEE Standard on Piezoelectricity, Copyright 1978 by The Institute of Electrical and Electronics, Engineers, Inc., pp. 1–55.

*Primary Examiner*—Daniel T. Pihulic
*Attorney, Agent, or Firm*—Gunn & Associates, P.C.

[57] ABSTRACT

A hydrophone transducer is prepared by depositing a piezo-electric material upon a conductive substrate or support structure, and then etching the material into selected regions or segments. The center segment, which provides most of the fundamental signal, is polarized in a first direction by the introduction of a polarizing voltage. The end segments are polarized in the opposite direction by the imposition of a polarizing voltage in the opposite direction. The conductive substrate then serves as one terminal of the output of the hydrophone while the upper surfaces of the segments together serve as the other terminal. The relative strengths of the signals from the segments may tailored by adjusting the areas of the segments.

11 Claims, 3 Drawing Sheets

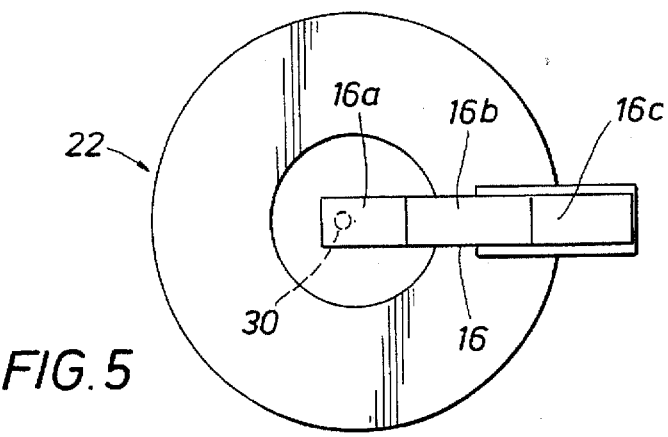
FIG.5
FIG.6
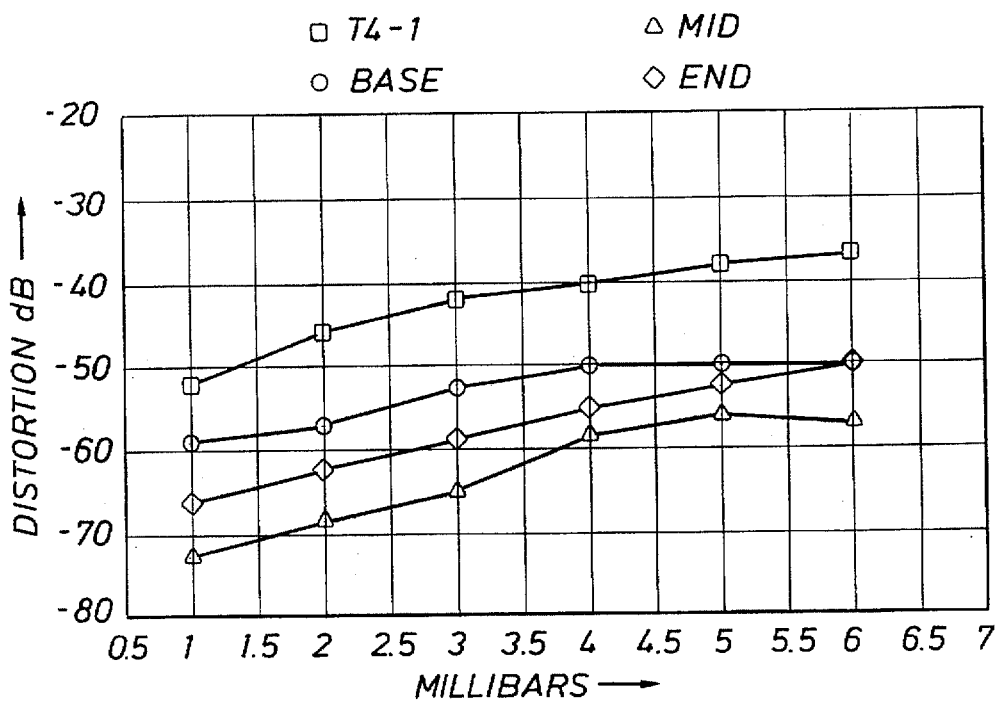
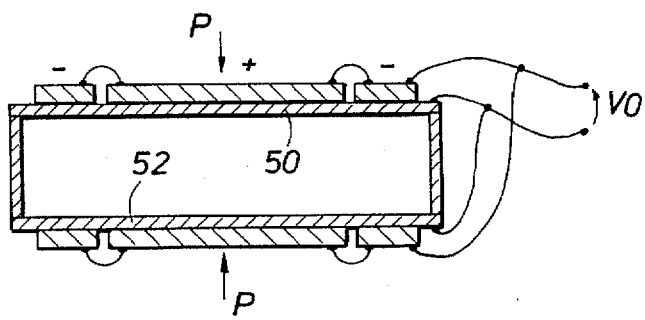
FIG.8

FIG. 7
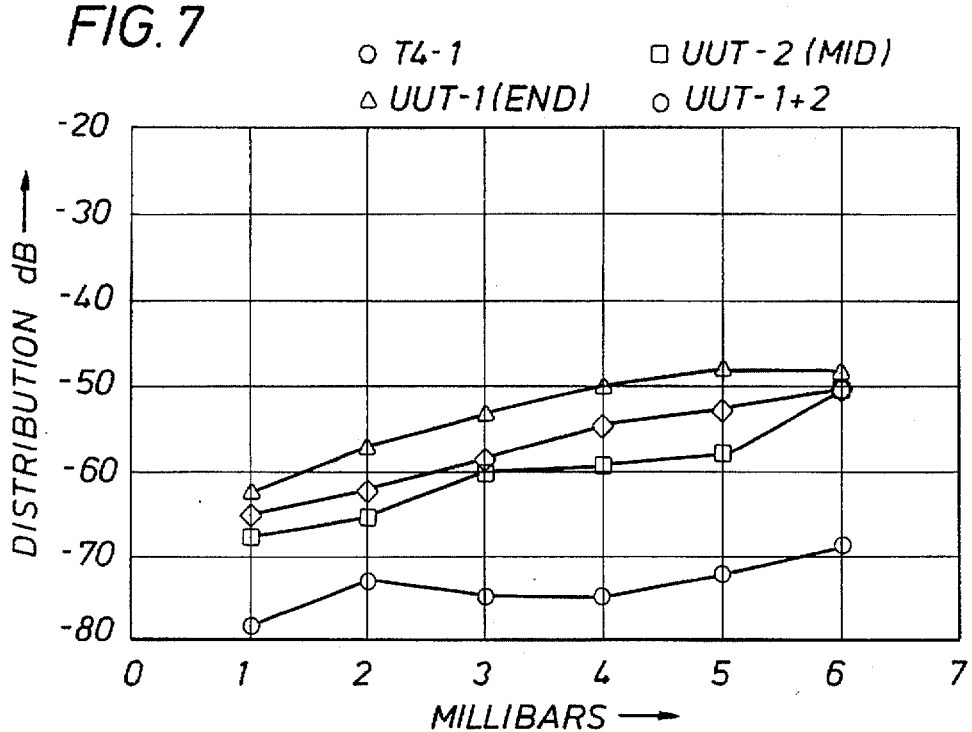
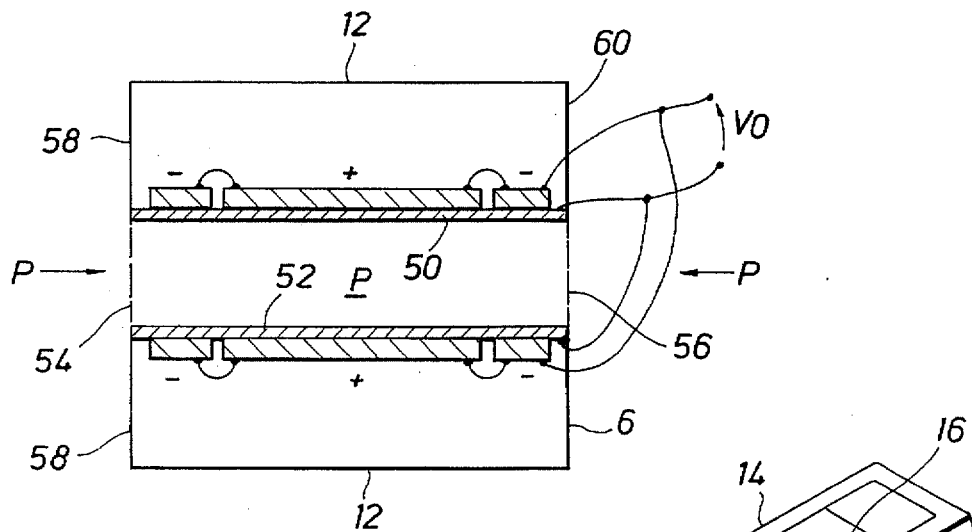
FIG. 9
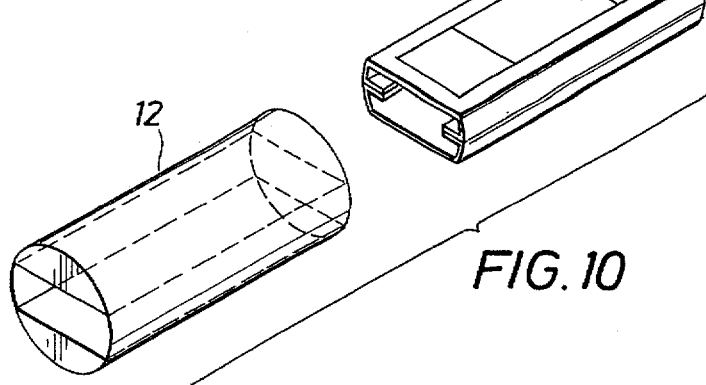
FIG. 10

SEGMENTATION AND POLARIZATION IN A HYDROPHONE CRYSTAL

This application is related to concurrently filed application Ser. No. 08/545,111 entitled Hydrophone Structure, assigned to the same assignee as the present application.

FIELD OF THE INVENTION

The present invention relates generally to the field of hydrophones and, more particularly, to a method and system for reducing the distortion from the piezoelectric elements in hydrophones by segmenting a hydrophone crystal into distinct regions and imposing opposite polarities onto segmented regions.

BACKGROUND OF THE INVENTION

Piezoelectric transducers for a variety of applications, including hydrophones, are well known. Piezoelectric devices respond to an application of stress, such as externally applied pressure, to develop an electrical potential. Conversely, piezoelectric devices develop a mechanical response when a voltage is applied. The behavior and characteristics of piezoelectric materials is well described in *IEEE Standard on Piezoelectricity*, 1978, incorporated herein by reference.

The earliest such applications for transducers were entirely analog. With the advent of digital technology, however, digital techniques were soon applied to signal detection and processing. This digital technology, in general, is capable of higher resolution than the previous analog techniques.

The earliest digital signal acquisition and processing data rates were extremely slow, and had fewer bits per sample, compared with the state of the art today. With slow bit rates, distortion produced by the piezoelectric crystals was relatively insignificant. In this context, the term "distortion" refers to the increasing significance of harmonics, particularly the second harmonic, compared to the fundamental of the signal, with increasing signal output. In other words, as stress on the piezoelectric device, for example in the form of pressure, increases, the amplitudes of the harmonics produced by the crystal increase at a rate that is faster than the rate of increase in the amplitude of the fundamental. Furthermore, as digital signal processing has increased in speed and resolution, the distortion of the signal from the harmonics has become more and more important. The clarity and resolution is thus dependent more and more on the signal from the transducer being relatively undistorted.

In certain applications such as seismic applications, noise from the background and other sources is of much higher amplitude than the return signal of interest. A variety of techniques, such as correlation, have been developed to extract the reflected, desired signal from this background noise. The non-linearity in the signal from the crystal will cause inter-modulation between the background noise and the desired signal. In other words, the desired signal will be amplitude modulated by the much larger noise signal, generating new families of modulation products, complicating the filtering process.

Equipment improvements in data rate, resolution, and linearity bring better definition in resultant profiles, to the point that errors and distortion from the transducer contribute most of the signal error. That means that an improvement in the accuracy of the transducer brings an immediate improvement in signal quality.

A further difficulty lies in the fact that, since there is no perfect transducer, there is no standard against which to measure the distortion from a transducer. This is illustrated in FIG. 10, page 36, in the previously mentioned *IEEE Standard on Piezoelectricity*.

Thus, there remains a need for a method and system to eliminate or at least minimize the effects of signal distortion from the active element in a transducer, such as a piezoelectric device. Such a method and system should eliminate the distortion effects of the piezoelectric device, despite the non-linearity of the element itself. The system should be self-contained and not have to rely on any other signal processing steps or other active elements such as transistors.

A viable solution to these and other problems was disclosed in co-pending application Ser. No. 08/452,386 entitled Low Distortion Hydrophone. In this disclosure, a first piezoelectric element is mounted so as to receive a pressure signal. A second piezoelectric element is provided with a means of receiving and enhancing the same pressure signal. Since a piezoelectric element is a capacitor, another capacitor is coupled in parallel with the second element to serve as a divider. The output voltage of the combination of the two elements is taken as the difference between the positive terminals of the two elements. Thus, the effect of the pressure enhancer and capacitance divider is to provide a difference in potential between the fundamentals from the two elements, while rendering the amplitude of the second harmonics equal. The two equal second harmonics cancel each other out at the output terminals, at least one pressure, while retaining a useful fundamental for further signal processing.

This disclosed improved hydrophone presents at least two draw-backs. First, it calls for distinct capacitive elements in addition to the piezoelectric crystal. Further, it calls for separate structure to enhance the pressure signal on a piezoelectric element. Thus, there remains a need for a hydrophone structure that eliminates the need for such separate elements.

It has also been found that the electrical signal attributable from various regions of a piezoelectric crystal varies according to the degree of stress impressed upon that region of the crystal. The recognition of this phenomenon should provide an opportunity to combine signals from different regions of the crystal to reduce distortion of the signal from higher order harmonics.

SUMMARY OF THE INVENTION

The present invention takes advantage of these discoveries by segmenting a piezoelectric hydrophone crystal into segments which experience different flexing stresses in the presence of an acoustic signal. The segments located on the ends of the crystal, while receiving the same acoustic pressure signal, experience a greater degree of flexing forces and thus deliver a greater relative secondary (and higher) harmonic signal per unit area. By carefully selecting the area of the end segments, and electrically coupling the segments so that the harmonics of the various segments are added out of phase, the distortion introduced the harmonics of the various phases subtract.

This feature is conveniently introduced by mounting a piezoelectric material upon a conductive substrate, and then etching the material into selected regions or segments. The center segment, which provides most of the fundamental signal, is polarized in a first direction by the introduction of a polarizing voltage. The end segments are polarized in the opposite direction by the imposition of a polarizing voltage in the opposite direction. The conductive substrate then serves as one terminal of the output of the hydrophone while the upper surfaces of the segments together serve as the other terminal. The relative strengths of the signals from the segments may tailored by adjusting the areas of the segments.

The present invention thus provides a new hydrophone element and structure, as well as a method of making the hydrophone structure. These and other features of the present invention will be readily apparent to those of skill in the art from a review of the following detailed description along with the accompanying drawings.

BRIEF DESCRIPTION OF THE DRAWINGS

FIG. 5 is a top view of the test rig of FIG. 3.

FIG. 6 is a plot of the test results of a segmented crystal element, built in accordance with the present invention, showing distortion vs. pressure.

FIG. 7 is a plot of the test results of another segmented crystal element, built in accordance with the present invention, showing distortion vs. pressure and further showing the effects of coupling the segments as depicted in FIGS. 4, 8, and 9.

FIG. 8 is a side view of a hydrophone with a segmented crystal of the present invention mounted to either side of a conductive substrate comprising a hydrophone mounting structure.

FIG. 9 is a side view of a hydrophone with a segmented crystal of the present invention mounted to either side of a mounting structure as shown in FIGS. 2a and 2b.

FIG. 10 is an exploded, perspective view depicting the installation of a mounting structure within a hydrophone casing, as shown in FIG. 1 and also showing the placement of a hydrophone crystal on the mounting structure.

DETAILED DESCRIPTION OF A PREFERRED EMBODIMENT

Figure 1:
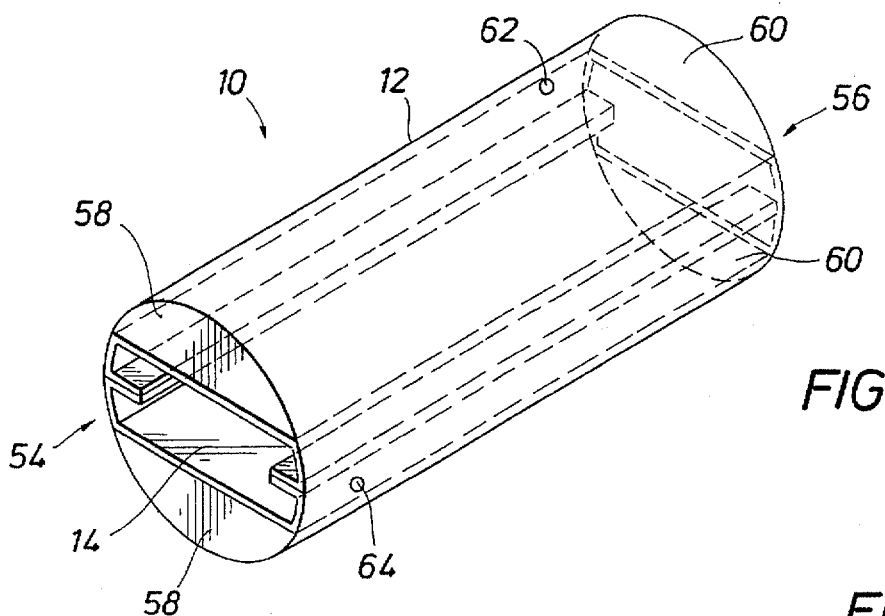
FIG. 1 is a perspective view of a hydrophone casing and mounting structure to which the hydrophone transducer of the present invention may be mounted.

Referring first to FIG. 1, a hydrophone structure 10 in which the present invention may find application is depicted. The structure 10 comprises primarily a casing 12 and a support element 14, which holds the piezoelectric crystal of the hydrophone. As shown in FIG. 10, the support element 14 is configured to fit within the casing 12 and to support a crystal element 16. The structure of the crystal element 16, and a method of forming the crystal element, is the subject of this invention.

Figure 2A:
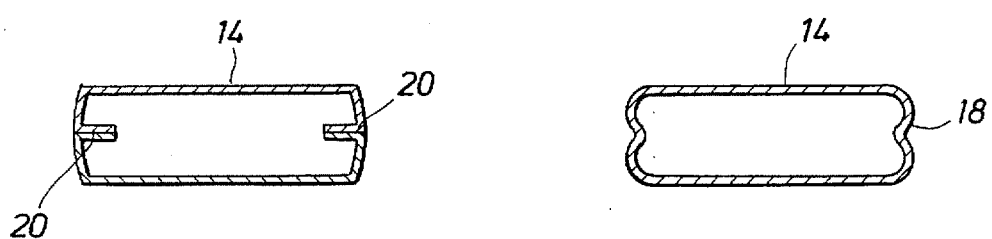
FIG. 2a is a section view of a hydrophone mounting structure.
Figure 2B:
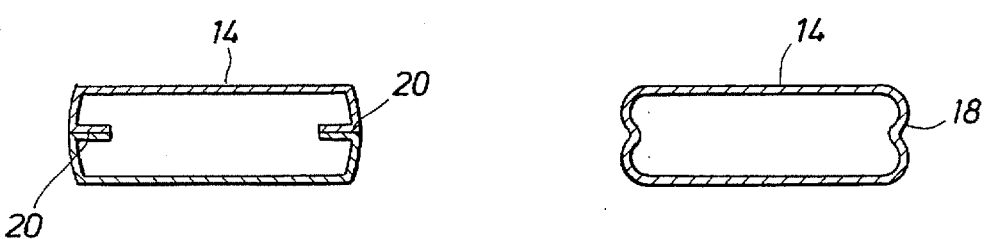
FIG. 2b is a section view of another hydrophone mounting structure.

FIGS. 2a and 2b depict cross sections of a preferred support element 14. FIG. 2a depicts a solid, extruded form of the support element and this form may be extruded in the form illustrated or, in the alternative, it may be extruded as a cylindrical tube and then forced under pressure to the substantially rectangular form. In either case, the form depicted in FIG. 2a includes a flexible wall member 18 that helps to eliminate non-signal vibrations that may be imparted to the hydrophone crystal mounted on the element 14. Alternatively, rather than being formed from an extrusion as shown in FIG. 2a, the support element 14 may be formed of two simple plates, bent and joined together as shown in FIG. 2b. This embodiment of the support element has the advantage of simple constituents but has the drawbacks (1) an additional manufacturing step of joining the two pieces and (2) a seam 20 which must serve as a pressure boundary.

Figure 3:
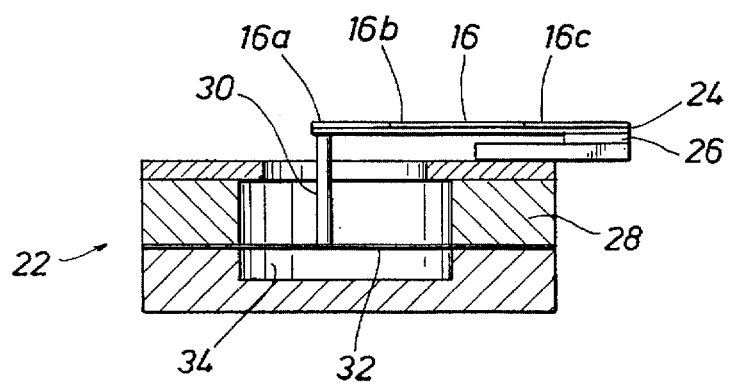
FIG. 3 is a side view of a test rig for testing the segmented piezoelectric hydrophone crystal of the present invention.

FIGS. 3-7 illustrate embodiments of the present invention, along with results of testing the embodiments. FIGS. 3 and 5 depict a test rig to test the effectiveness of the present invention to reduce distortion in a hydrophone and FIG. 6 depicts the test results from this test rig.

Referring to FIGS. 3 and 5, a piezoelectric element was constructed in accordance with the present invention and mounted to a test structure 22. This device is referred to as Device No. 1 in Table 1. Such a piezoelectric crystal element may be acquired from EDO in Salt Lake City, Utah.

A piezoelectric element 16 is placed on a conductive substrate 24, preferably by deposition. The element 16 may then be etched to separate the element into at least two and preferably three segments 16a, 16b, and 16c. The segment 16a may be referred to herein as the end segment or unit under test 1 (UTT-1). The segment 16b may be referred to as the mid segment or unit under test 2 (UTT-2). Segment 16c may be referred to as the base.

The base 16c is mounted to a pedestal 26 which in turn is mounted to a test rig body 28. The end segment 16a is attached to a diaphragm rod 30 which connects the element 16 to the upper side of a diaphragm 32. On the opposite side of the diaphragm is a chamber 34 which permits the diaphragm to freely flex in the presence of a sound pressure signal.

The mid segment 16b is polarized in a first direction by the application of a polarizing voltage, for example 300 VDC. It is known that the application of such a voltage for a sufficient period of time will polarize a piezoelectric material indefinitely. The end segment 16a and the base segment 16c are similarly polarized, but in the opposite direction, by the application of a polarizing voltage in the opposite direction. The polarized segments are then individually coupled to outputs to determine the distortion from each.

Application of various pressure signals to the device shown in FIG. 3 resulted in the plot shown in FIG. 6. The shaded square data points were obtained from a standard Teledyne T4-1 hydrophone, which was used as a reference for illustration purposes only. For these tests, the distortion was defined as the fraction of the second harmonic relative to the entire signal from the hydrophone. As shown in FIG. 6, in general, the distortion from the various segments and from the reference increases with increasing pressure signal.

Further, it should be noted that the mid segment 16b has the lowest distortion at every pressure. This is because it has been recognized that the end segment 16a and the base segment 16c experience greater sires s than the mid segment 16b and thus contribute relatively more distortion than the mid segment. By segmenting or segregating the higher stress regions of the crystal element from the lower stress region, overall distortion is reduced.

Measured test results from Device Number 1 are shown below in Table 1.

TABLE 1

(Device Number 1)

| MB | T4-1 | Base | Mid | End | MV Base | MV Mid | MV End | MV T4-1 |
|---|---|---|---|---|---|---|---|---|
| 6 | −50 | −50 | −57 | −36 | 330 | 215 | 32 | 226 |
| 5 | −52 | −50 | −55 | −38 | 272 | 183 | 28 | 190 |
| 4 | −55 | −50 | −58 | −40 | 225 | 147 | 22 | 153 |
| 3 | −59 | −53 | −64 | −42 | 170 | 110 | 17 | 115 |
| 2 | −62 | −57 | −68 | −46 | 112 | 74 | 11 | 77 |
| 1 | −66 | −59 | −72 | −52 | 56 | 37 | 5.7 | 38 |

Capacitance (nf)

| | | 11.0 | 11.1 | 9.2 | | | | |
|---|---|---|---|---|---|---|---|---|

Sensitivity (V/BAR)

| | | 56 | 40.3 | 7 | | | | |
|---|---|---|---|---|---|---|---|---|

Figure 4:
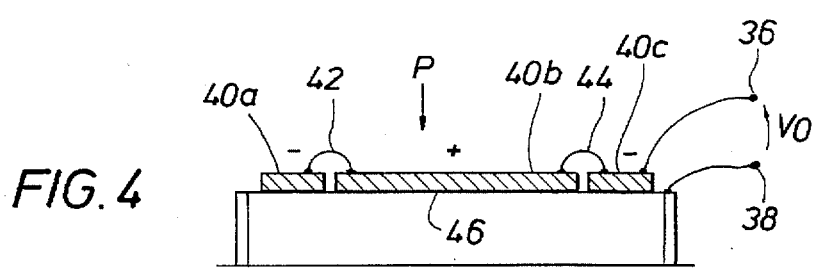
FIG. 4 is a side view of the segmented hydrophone crystal depicting electrical coupling of the segments.

It has also been recognized that the signals produced by the end and base segments are of opposite polarity from those of the mid segment. If the segments are coupled together as shown in FIG. 4, and the areas of the various segments are carefully controlled so that the second harmonic tends to cancel, significantly reduced distortion results. It should be appreciated that, in the end and base segments, the second harmonic is relatively greater than in the mid segment. Thus, while the second harmonics from the end and base segments tend to cancel out the second harmonic from the mid segment, the fundamental from the end and base segments are relatively less significant and do not cancel out the fundamental from the mid segment.

Thus, a Device number 2 was constructed and tested. The test results are depicted below in Table 2.

TABLE 2

(Device Number 2)

| MB | T4−1 | End | Mid | End + Mid |
|---|---|---|---|---|
| 6 | −50 | −48 | −50 | −68 |
| 5 | −53 | −48 | −57 | −72 |
| 4 | −55 | −50 | −59 | −75 |
| 3 | −59 | −53.5 | −60 | −75 |
| 2 | −62 | −57 | −65 | −73 |
| 1 | −66 | −63 | −68 | −78 |

Capacitance of UUT-1 (Unit Under Test No. 1 or End segment) and UUT-2 (Mid segment) are both 18.7 nf.
Sensitivity of UUT-1 = −195.9 dB or 16.03245 V/BAR
Sensitivity of UUT-2 = −187.2 dB or 43.65158 V/BAR Note that, for the purposes of this test, only the signals from the end segment (UTT-1) and mid segment (UTT-2). The test results, shown graphically in FIG. 7, illustrate significantly reduced distortion when the signals are added (180° out of phase).

FIGS. 4–6 depict preferred embodiments for the arrangement of the crystal segments. In these Figures, the thickness of the crystal element and the etched gaps between the segments are exaggerated for ease of illustration.

In FIG. 4, a segment 40a and a segment 40c are polarized in the opposite direction from a segment 40b. The segments are then coupled by jumpers 42 and 44. The jumpers 42 and 44 couple to the segments through a conductive layer, preferably silver. One terminal 36 of the transducer is taken from the upper surface of the crystal and the other terminal 38 is taken from a conductive substrate 46. The substrate 46 may also be mounted to and insulated from a separate diaphragm element.

It has been found that having a transducer element mounted to one side of the diaphragm may cause undesirable acceleration effects, such as those caused by motion of the hydrophone in addition to the vibrating motion of the diaphragm. To eliminate these acceleration effects, a piezoelectric element may be added to the underside of the support structure as well, as shown in FIG. 8. The various segments of the crystal elements so formed may then be electrically coupled as shown.

Referring now to FIGS. 1, 9, and 10, it is preferred to mount the piezoelectric crystal element of the present invention to the support structure shown in cross section in FIGS. 2a and 2b. The section view of FIG. 9 is along the longitudinal axis of the support structure while the section views of FIGS. 2a and 2b are along the transverse axes of those embodiments, respectively.

A feature of the assembly of FIGS. 1, 9, and 10, in contrast to the embodiments heretofore described, it that the pressure signal is conducted within the support structure. The support structure defines an upper wall 50, on which is mounted a set of crystal segments, and a lower wall 52, on which is mounted another set of crystal segments. The segments are then electrically coupled as illustrated in FIG. 9. The sound pressure signal is conducted from outside the hydrophone through openings 54 and 56, into the interior of the hydrophone. When the hydrophone is assembled as shown in FIG. 1, the support structure 14 is preferably sealed to the casing 12 by end-plates 58 and 60. The volume between the casing 12 and the support structure 14 may then be (almost) filled with a fluid, such as oil. To accommodate the sound signal and permit the piezoelectric elements to flex, a small air bubble 62 acts as a cushion. If there is no fluid communication between the chambers above and below the support structure, another bubble 64 acts a cushion to permit flexing of the crystal segments on the underside of the support structure.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A hydrophone transducer comprising:
   a. an electrically conductive support element, the support element defining a substantially rectangular cross section with opposed upper and lower walls and opposed side walls between the upper and lower walls;
   b. a segmented piezoelectric crystal on the support element, the crystal defining a first surface in contact with the support element and a second surface opposite the support element, wherein a first segment of the crystal is polarized in a direction opposite to that of a second segment of the crystal;
   c. a first output terminal of the transducer electrically coupled to the support element; and
   d. a second output terminal of the transducer electrically coupled to the second surface.

2. A method of forming a hydrophone piezoelectric transducer element comprising the steps of:
   a. providing an electrically conductive support element, the support element defining a substantially rectangular cross section with opposed upper and lower walls and opposed side walls between the upper and lower walls;
   b. placing a segmented piezoelectric crystal on the support element, the crystal defining a first surface in contact with the support element and a second surface opposite the support element, wherein a first segment of the crystal is polarized in a direction opposite to that of a second segment of the crystal;

c. electrically coupling a first output terminal of the transducer to the support element; and d. electrically coupling a second output terminal of the transducer to the second surface.

3. The method of claim 2, wherein the piezoelectric crystal is secured to the support element by a conductive epoxy.

4. The method of claim 3, wherein the piezoelectric crystal is segmented by etching the crystal.

5. The transducer of claim 1, wherein the crystal is mounted on the upper wall.

6. The transducer of claim 5, further comprising:

a. a second crystal mounted on the lower wall outside the channel, the second crystal defining a third surface in contact with the support element and a fourth surface opposite the support element;

b. wherein the third surface is electrically coupled to the first output terminal; and c. wherein the fourth surface is electrically coupled to the second output.

7. A piezoelectric hydrophone element comprising a piezoelectric crystal segmented into high-stress segments and a low-stress segment with the high-stress segments polarized in a first direction and the low-stress segment polarized in a second direction, the element mounted upon an electrically conductive support element defining a substantially rectangular cross section with opposed upper and lower walls and opposed side walls between the upper and lower walls.

8. The hydrophone element of claim 7 wherein the element is mounted upon the support with an electrically conductive epoxy.

9. The hydrophone element of claim 7, further comprising a first output terminal coupled to the high-stress segments and a second output terminal coupled to the low-stress segment.

10. The hydrophone element of claim 9 further comprising a conductive layer coupling the high-stress segments and the low-stress segments to the first and second output terminals.

11. The hydrophone element of claim 10 in which the conductive layer is silver.

* * * * *